(12) United States Patent
Zhao et al.

(10) Patent No.: US 11,847,387 B1
(45) Date of Patent: Dec. 19, 2023

(54) METHOD AND SYSTEM FOR PREDICTING CREEP-FATIGUE LIFE OF STRUCTURAL PART OF THERMAL POWER UNIT

(71) Applicant: Tianjin University, Tianjin (CN)

(72) Inventors: Lei Zhao, Tianjin (CN); Lianyong Xu, Tianjin (CN); Kai Song, Tianjin (CN); Yongdian Han, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/131,517

(22) Filed: Apr. 6, 2023

(30) Foreign Application Priority Data

Aug. 9, 2022 (CN) .......................... 202210947854.5

(51) Int. Cl.
*G06F 30/20* (2020.01)
*G06F 119/02* (2020.01)
*G06F 119/08* (2020.01)

(52) U.S. Cl.
CPC .......... *G06F 30/20* (2020.01); *G06F 2119/02* (2020.01); *G06F 2119/08* (2020.01)

(58) Field of Classification Search
CPC ... G06F 30/20; G06F 2119/08; G06F 2119/02
See application file for complete search history.

(56) References Cited

FOREIGN PATENT DOCUMENTS

| CN | 111460583 A | * 7/2020 | ............. G06F 30/15 |
|---|---|---|---|
| CN | 111879636 A | * 11/2020 | ............. G01N 3/32 |
| CN | 113514350 A | * 10/2021 | ............. G01N 3/32 |
| CN | 114239175 A | 3/2022 | |

OTHER PUBLICATIONS

Zhang Z, Jing H, Xu L, Han Y, Zhao L. Investigation on microstructure evolution and properties of duplex stainless steel joint multi-pass welded by using different methods. Materials & Design. Nov. 5, 2016;109:670-85. (Year: 2016).*

Zhao L, Jing H, Xu L, Han Y, Xiu J. Evaluation of constraint effects on creep crack growth by experimental investigation and numerical simulation. Engineering Fracture Mechanics. Dec. 1, 2012;96:251-66. (Year: 2012).*

Zou Pingping et al., Thermal-Mechanical Fatigue Prediction of Engine Cylinder Heaf Based on the Sehitoglu Model, Journal of Mechanical Strength, 2021, pp. 1184-1190, vol. 43, Issue 5.

Run-Zi Wang et al., A modified strain energy density exhaustion model for creep-fatigue life prediction, International Journal of Fatigue, 2016, pp. 12-22, vol. 90.

* cited by examiner

*Primary Examiner* — Chuen-Meei Gan

(57) ABSTRACT

The present invention discloses a method and system for predicting a creep-fatigue life of a structural part of a thermal power unit. The method includes: constructing a life prediction model; acquiring a stress relaxation curve in a strain control creep-fatigue test through pure creep data to calculate an initial creep damage; acquiring a cyclic hardening coefficient, an elasticity modulus and other related material constants through the pure fatigue data to calculate an initial fatigue damage; and acquiring a difference between strain energy densities in upper and lower parts of creep-fatigue mean stress, making the difference between strain energy densities less than a set threshold through dichotomy iteration to acquire a final creep damage, a final fatigue damage and an oxidative damage under such a circumstance, and predicting the creep-fatigue life of the high-temperature structural part based on the life prediction model.

6 Claims, 6 Drawing Sheets

METHOD AND SYSTEM FOR PREDICTING CREEP-FATIGUE LIFE OF STRUCTURAL PART OF THERMAL POWER UNIT

TECHNICAL FIELD

The present invention relates to the technical field of creep-fatigue life prediction of materials, and particularly relates to a method and system for predicting a creep-fatigue life of a structural part of a thermal power unit.

BACKGROUND

A structural part of a thermal power unit serves in a high-temperature and high-pressure stream environment to generate a creep damage and an oxidative damage, and also bears cyclic stress caused by short-time temperature and load fluctuation to generate a fatigue damage. Under a creep-fatigue interactive load, a material usually shows a failure mode different from a single creep (fatigue) load, which accelerates rupture of the structural part, threatening stable operation of the structural part of the thermal power unit. Therefore, to establish and prefect a life prediction system of a high-temperature structural part under the creep-fatigue load is an important guarantee for normal and safe operation of the thermal power unit.

At present, there are primarily three frequently used creep-fatigue life prediction methods which are a time fraction method, a ductility dissipation method and a strain energy density dissipation method, respectively. In cases where the three methods are used, a creep-fatigue test needs to be conducted first to acquire a stress relaxation curve, and the creep damage is calculated through the stress relaxation curve. It means that creep-fatigue life prediction cannot be carried out if the creep-fatigue test is not conducted. In addition, the three methods all adopt a bilinear damage frame, neglecting the accelerating action of a creep cavity on germination and expansion of a fatigue crack, the promoting action of the fatigue crack on germination of the creep cavity and the accelerating effect of the oxidative damage on the creep damage and the fatigue damage. These factors all cause underestimation of the total damage under the creep-fatigue load effect, resulting in prolonged service life predicted. Therefore, by considering the interaction effect among creep, fatigue and oxidative damage, to develop a method for predicting a creep-fatigue life based on pure creep data and pure fatigue data is of great significance to rapidly evaluating the service life of the high-temperature structural part under a complex load condition.

SUMMARY

In order to solve the above problems, aiming at the requirement on fast and convenient development of life prediction under the creep-fatigue load effect, the objective of the present invention is to provide a method for predicting a creep-fatigue life based on pure creep data and pure fatigue data. The method can effectively solve problems that an existing prediction method relies on data of a creep-fatigue test and does not consider the interaction effect of creep, fatigue and oxidation comprehensively and the like. Therefore, a novel method for evaluating the creep-fatigue performance of the structural part of the thermal power unit serving in a complex working condition is provided.

In order to achieve the above technical objective, the present invention provides a method for predicting a creep-fatigue life of a structural part of a thermal power unit, including the following steps:

constructing a creep-fatigue life prediction model for predicting a high-temperature creep-fatigue life of the structural part of the thermal power unit according to a creep damage and a fatigue damage of the structural part of the thermal power unit and an oxidative damage based on cycle number, wherein an expression of the creep-fatigue life prediction model is as follows:

$$N_{CF} = \frac{1}{\frac{d_c}{1-d_f-d_o} + \frac{d_f}{1-d_c-d_o} + d_o}$$

where $d_c$ represents the creep damage, $d_f$ represents the fatigue damage, and $d_o$ represents the oxidative damage.

Preferably, the constructing the life prediction model includes: in the process of constructing the creep-fatigue life prediction model, acquiring an initial creep damage according to a stress relaxation curve of the structural part of the thermal power unit;

generating an initial fatigue damage according to a cyclic hardening coefficient, an elasticity modulus and other related material constants of the structural part of the thermal power unit; and acquiring a difference between strain energy densities in upper and lower parts of creep-fatigue mean stress based on the initial creep damage and the initial fatigue damage, and making the difference between strain energy densities less than a set threshold through dichotomy iteration to acquire a creep damage, a fatigue damage and an oxidative damage under such a circumstance, so as to construct the creep-fatigue life prediction model.

Preferably, in the process of constructing the creep-fatigue life prediction model, an expression of the creep damage is as follows:

$$d_c = \int_0^{t_h} \frac{\dot{\sigma} \cdot (\sigma - \sigma_{th})}{E \cdot w_f(\dot{w}, T)} - \frac{\dot{\sigma} \cdot (\sigma - \sigma_{th})}{E \cdot w_{f,max}(\dot{w}, T)} dt;$$

an expression of the fatigue damage is as follows:

$$d_f = \left\{ \frac{C(1+n')}{(1-n')\sigma_T[\Delta\varepsilon_T - (\sigma_T - \sigma_C)/E] + n'(\sigma_T + \sigma_C)[\Delta\varepsilon_t - (\sigma_T - \sigma_C)/E]} \right\}^\gamma;$$

an expression of the oxidative damage is as follows:

$$d_o = 0.5^{20} \int 0.5 \sqrt{k_p} t^{-0.5} dt;$$

where $\sigma$ represents a stress intensity at time t, $\dot{\sigma}$ represents a stress change rate at time t, E represents the elasticity modulus of a material under a cyclic load, $w_f$ represents a creep rupture strain energy, σth represents a holding time in the creep-fatigue test, σth represents creep threshold stress under a pure creep condition, n' represents the cyclic hardening coefficient under a pure fatigue condition, σT represents peak stretching stress under a creep-fatigue condition, σC represents peak compression stress under the creep-fatigue condition, C and γ represent constants of the material under the pure fatigue condition, $\Delta\varepsilon_t$ represents a total strain range under the creep-fatigue condition, and $k_p$ is a thickness coefficient of an oxidation film.

Preferably, in the processes of acquiring the strain energy density in the upper part, an expression of the strain energy density in the upper part is as follows:

$$W_{upper} = \left(\frac{1-n'}{1+n'}\right)[\sigma_T - 0.5 \times (\sigma_T + \sigma_C)]\left[\Delta\varepsilon_t - \frac{(\sigma_T - \sigma_C)}{E}\right] +$$

$$\frac{[\sigma_T - 0.5 \times (\sigma_T + \sigma_C)]^2 - [\sigma_H - 0.5 \times (\sigma_T + \sigma_C)]^2}{2E}$$

where σH represents the stress when the holding time is over under the creep-fatigue condition.

Preferably, in the processes of acquiring the strain energy density in the lower part, an expression of the strain energy density in the lower part is as follows:

$$W_{lower} = \left(\frac{1-n'}{1+n'}\right)[\sigma_T - 0.5 \times (\sigma_T + \sigma_C)]\left[\Delta\varepsilon_t - \frac{(\sigma_C - \sigma_H)}{E}\right].$$

Preferably, in the process of acquiring the initial creep damage, based on the pure creep data, the stress relaxation curve is generated according to the relation between a mean creep rate and the stress, wherein an expression of the mean creep rate is as follows:

$$\dot{\varepsilon}_\sigma = \frac{\varepsilon_f}{t_r} = \dot{\varepsilon}^* \frac{\sigma}{\sigma^*}\left[1 + \left(\frac{\sigma}{\sigma^*}\right)^{n^*-1}\right]$$

where ε' presents the creep rupture strain under the stress σ, tr represents the creep life under the stress σ, $\dot{\varepsilon}^*$, and n* represent the constants of the material under the pure creep condition.

Preferably, in the process of generating the stress relaxation curve, an expression of the stress relaxation curve is as follows:

$$\sigma(t) = \frac{\sigma_T \exp(-\dot{\varepsilon}^* Et/\sigma^*)}{\left\{1 + \left(\frac{\sigma_T}{\sigma^*}\right)^{n^*-1}[1 - \exp(t - \dot{\varepsilon}^* n^* Et/\sigma^*)]\right\}^{\frac{1}{n^*-1}}}.$$

The present invention discloses a system for predicting a creep-fatigue life of a structural part of a thermal power unit, including:

a data acquisition module, configured to acquire a creep damage, a fatigue damage and an oxidative damage based on a cycle number of the structural part of the thermal power unit; and a prediction module, configured to predict a high-temperature creep-fatigue life of the structural part of the thermal power unit by constructing a creep-fatigue life prediction model, wherein an expression of the creep-fatigue life prediction model is as follows:

$$N_{CF} = \frac{1}{\frac{d_c}{1-d_f-d_o} + \frac{d_f}{1-d_c-d_o} + d_o}$$

where $d_c$ represents the creep damage, $f_f$ represents the fatigue damage, and $d_o$ represents the oxidative damage.

The present invention discloses the following technical effects:

1. The method for predicting the creep-fatigue life based on pure creep data and pure fatigue data provided by the present invention overcomes the limitation that a conventional life prediction method needs to fit parameters through data of a creep-fatigue test;

2. The present invention solves the problem that the conversion error in a high stress interval of the pure creep data used in the creep-fatigue test is big;

3. The present invention considers the nonlinear interaction among the creep damage, the fatigue damage and the oxidative damage under the creep-fatigue condition;

4. Through verification, compared with a conventional prediction method based on data of the creep-fatigue test, creep-fatigue life prediction provided by the present invention has a good effect.

BRIEF DESCRIPTION OF THE DRAWINGS

In order to describe the embodiments of the present invention or the technical solutions in the prior art more clearly, brief introduction on accompanying drawings needed to be used in the embodiment will be made below. It is obvious that the accompanying drawings described below are merely some embodiments of the present invention, and those of ordinary skill in the technical field further can obtain other accompanying drawings according to these accompanying drawings without creative efforts.

DETAILED DESCRIPTION

Figure 1:
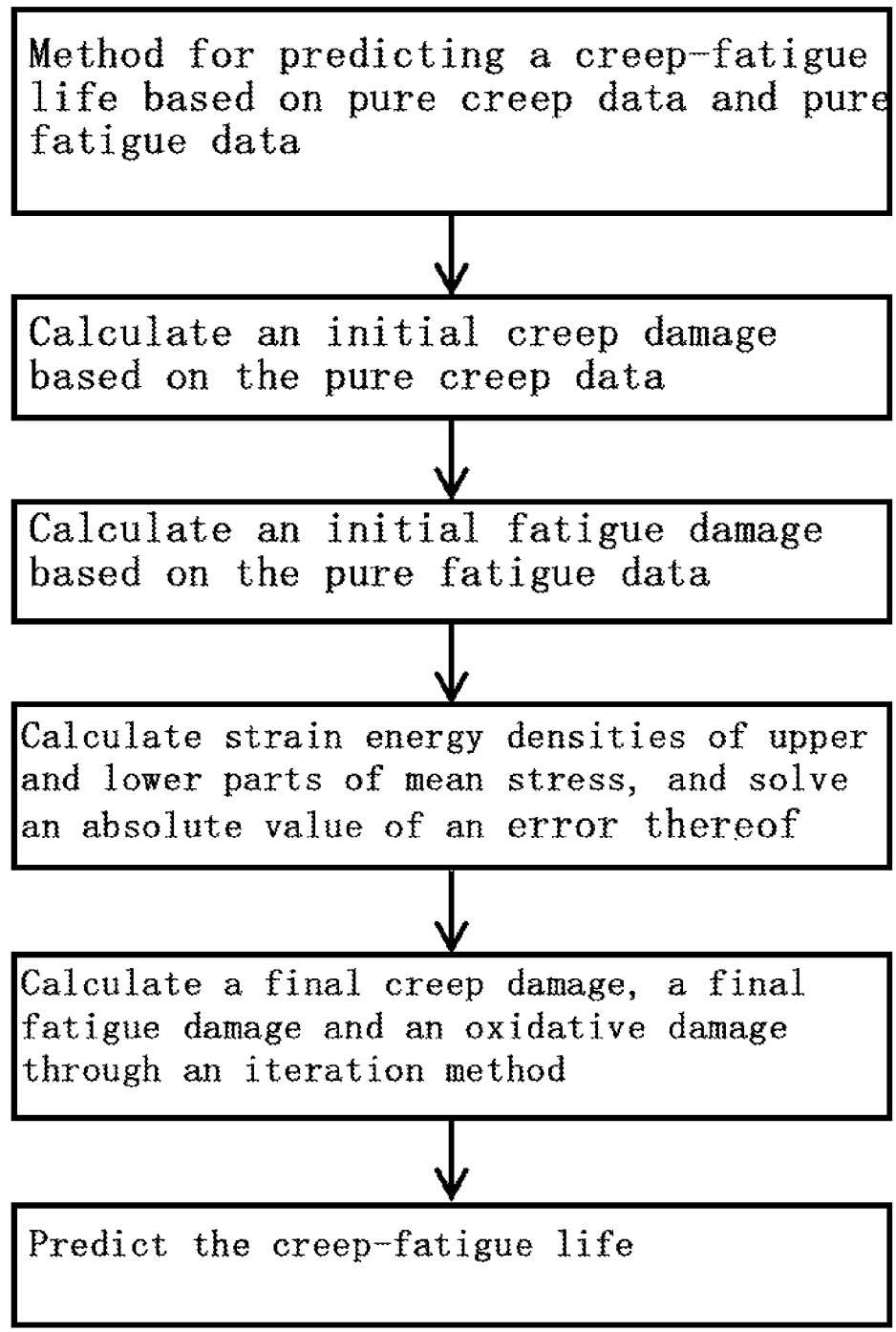
FIG. 1 is a schematic diagram of a research route of a method for predicting a creep-fatigue life based on pure creep data and pure fatigue data in the present invention.

To make the objectives, technical solutions and advantages of the embodiments of the present application clearer, the technical solutions in the embodiments of the present application will be described clearly and intactly below in combination with accompanying drawings in the embodiments of the present application. Apparently, the described embodiments are merely a part of, rather than all of, the embodiments of the present application. Assemblies in the embodiments of the present application described and illustrated in the accompanying drawings herein may usually be arranged and designed in various different configurations. Therefore, detailed description on the embodiments of the present application provided in the accompanying drawings is not intended to limit the scope of the accompanying application claimed, and merely represents a selected embodiment of the present application. On the basis of the embodiments of the present application, all other embodiments obtained by those skilled in the art without creative efforts fall into the scope of protection of the application.

As shown in FIG. 1-6, the present invention provides a method for predicting a creep-fatigue life of a structural part of a thermal power unit, including the following steps:

constructing a creep-fatigue life prediction model for predicting a high-temperature creep-fatigue life of the structural part of the thermal power unit according to a creep damage and a fatigue damage of the structural part of the thermal power unit and an oxidative damage based on cycle number, wherein an expression of the creep-fatigue life prediction model is as follows:

$$N_{CF} = \cfrac{1}{\cfrac{d_c}{1-d_f-d_o} + \cfrac{d_f}{1-d_c-d_o} + d_o}$$

where $d_c$ represents the creep damage, $d_f$ represents the fatigue damage, and $d_o$ represents the oxidative damage.

Further preferably, the constructing the life prediction model includes: in the process of constructing the creep-fatigue life prediction model, acquiring an initial creep damage according to a stress relaxation curve of the structural part of the thermal power unit;

generating an initial fatigue damage according to a cyclic hardening coefficient, an elasticity modulus and other related material constants of the structural part of the thermal power unit; and acquiring a difference between strain energy densities in upper and lower parts of creep-fatigue mean stress based on the initial creep damage and the initial fatigue damage, and making the difference between strain energy densities less than a set threshold through dichotomy iteration to acquire a creep damage, a fatigue damage and an oxidative damage under such a circumstance, so as to construct the creep-fatigue life prediction model.

Further preferably, in the process of constructing the creep-fatigue life prediction model, an expression of the creep damage mentioned in the present invention is as follows:

$$d_c = \int_0^{\sigma h} \frac{\dot{\sigma} \cdot (\sigma - \sigma_{th})}{E \cdot w_f(\dot{w}, T)} - \frac{\dot{\sigma} \cdot (\sigma - \sigma_{th})}{E \cdot w_{f,max}(\dot{w}, T)} dt;$$

an expression of the fatigue damage mentioned in the present invention is as follows:

$$d_f = \left\{ \frac{C(1+n')}{(1-n')\sigma_T[\Delta\varepsilon_t - (\sigma_T - \sigma_C)/E] + n'(\sigma_T + \sigma_C)[\Delta\varepsilon_t - (\sigma_T - \sigma_C)/E]} \right\}^{\gamma};$$

an expression of the oxidative damage mentioned in the present invention is as follows:

$$d_o = 0.50^{20} \int 0.5\sqrt{k_p} t^{-0.5} dt;$$

where σ represents a stress intensity at time t, $\dot{\sigma}$ represents a stress change rate at time t, E represents the elasticity modulus of a material under a cyclic load, $w_f$ represents a creep rupture strain energy, σh represents a holding time in the creep-fatigue test, σth represents creep threshold stress under a pure creep condition, n' represents the cyclic hardening coefficient under a pure fatigue condition, σT represents peak stretching stress under a creep-fatigue condition, σC represents peak compression stress under the creep-fatigue condition, C and γ represent constants of the material under the pure fatigue condition, $\Delta\varepsilon_t$ represents a total strain range under the creep-fatigue condition, and $k_p$ is a thickness coefficient of an oxidation film.

Further preferably, in the processes of acquiring the strain energy density in the upper part, an expression of the strain energy density in the upper part mentioned in the present invention is as follows:

$$W_{upper} = \left(\frac{1-n'}{1+n'}\right)[\sigma_T - 0.5 \times (\sigma_T + \sigma_C)]\left[\Delta\varepsilon_t - \frac{(\sigma_T - \sigma_C)}{E}\right] + \frac{[\sigma_T - 0.5 \times (\sigma_T + \sigma_C)]^2 - [\sigma_H - 0.5 \times (\sigma_T + \sigma_C)]^2}{2E}$$

where σH represents stress when the holding time is over under the creep-fatigue condition.

Further preferably, in the processes of acquiring the strain energy density in the lower part, an expression of the strain energy density in the lower part mentioned in the present invention is as follows:

$$W_{lower} = \left(\frac{1-n'}{1+n'}\right)[\sigma_T - 0.5 \times (\sigma_T + \sigma_C)]\left[\Delta\varepsilon_t - \frac{(\sigma_C - \sigma_H)}{E}\right].$$

Further preferably, in the process of acquiring the initial creep damage, based on the pure creep data, the stress relaxation curve is generated according to the relation between a mean creep rate and the stress, wherein an expression of the creep damage mentioned in the present invention is as follows:

$$\dot{\varepsilon}_a = \frac{\varepsilon_f}{t_r} = \dot{\varepsilon}^* \frac{\sigma}{\sigma^*}\left[1 + \left(\frac{\sigma}{\sigma^*}\right)^{n^*-1}\right]$$

where εf represents the creep rupture strain under the stress σ, tr represents the creep life under the stress σ, $\dot{\varepsilon}^*$, σ* and n* represent the constants of the material under the pure creep condition.

Further preferably, in the process of generating the stress relaxation curve, an expression of the stress relaxation curve mentioned in the present invention is as follows:

$$\sigma(t) = \frac{\sigma_T \exp(-\dot{\varepsilon}^* E t / \sigma^*)}{\left\{1 + \left(\frac{\sigma_T}{\sigma^*}\right)^{n^*-1}[1 - \exp(t - \dot{\varepsilon}^* n^* E t / \sigma^*)]\right\}^{\frac{1}{n^*-1}}}.$$

The present invention further discloses a system for predicting a creep-fatigue life of a structural part of a thermal power unit, including:

a data acquisition module, configured to acquire a creep damage, a fatigue damage and an oxidative damage based on a cycle number of the structural part of the thermal power unit; and a prediction module, configured to predict a high-temperature creep-fatigue life of the structural part of the thermal power unit by constructing a creep-fatigue life prediction model, wherein an expression of the creep-fatigue life prediction model is as follows:

$$N_{CF} = \cfrac{1}{\cfrac{d_c}{1-d_f-d_o} + \cfrac{d_f}{1-d_c-d_o} + d_o}$$

where $d_c$ represents the creep damage, $d_f$ represents the fatigue damage, and $d_o$ represents the oxidative damage.

Embodiment 1: as shown in FIG. 1, the method for predicting a creep-fatigue life of a structural part of a thermal power unit provided by the present invention includes a method for predicting a creep-fatigue life based on creep damage of pure creep data, fatigue damage of pure fatigue data and oxidative damage based on cycle number. Further description is made through a pure creep test and a pure fatigue test. A test material is P91 martensitic heat resistant steel, and a test temperature is 550° C. Strain loading is used in the creep-fatigue test predicted, the load is held at the peak strain, and the loading waveform is a trapezoidal wave.

In step (1), a creep-fatigue life prediction model considering interaction among nonlinear creep damage, fatigue damage and oxidative damage is provided:

$$N_{CF} = \frac{1}{\frac{d_c}{1-d_f-d_o} + \frac{d_f}{1-d_c-d_o} + d_o}$$

where $d_c$ represents the creep damage, $d_f$ represents the fatigue damage, and $d_o$ represents the oxidative damage. A specific expression of $d_c$, $d_f$ and $d_o$ is as follows:

$$d_c = \int_0^{t_h} \frac{\dot{\sigma} \cdot (\sigma - \sigma_{th})}{E \cdot w_f(\dot{w}, T)} - \frac{\dot{\sigma} \cdot (\sigma - \sigma_{th})}{E \cdot w_{f,max}(\dot{w}, T)} dt$$

$$d_f = \left\{ \frac{C(1+n')}{(1-n')\sigma_T[\Delta\varepsilon_t - (\sigma_T - \sigma_C)/E] + n'(\sigma_T - \sigma_c)[\Delta\varepsilon_t - (\sigma_T - \sigma_C)/E]} \right\}^\gamma$$

$$d_o - 0.5^{20} \int 0.5\sqrt{k_p t}^{-0.5} dt$$

where $\sigma$ represents a stress intensity at time t, $\dot{\sigma}$ represents a stress change rate at time t, E represents the elasticity modulus of a material under a cyclic load, $w_f$ represents a creep rupture strain energy, $\sigma$th represents a holding time in the creep-fatigue test, $\sigma$th represents creep threshold stress under a pure creep condition, n' represents the cyclic hardening coefficient under a pure fatigue condition, $\sigma$T represents peak stretching stress under a creep-fatigue condition, C and $\gamma$ represent constants of the material under the pure fatigue condition, $\Delta\varepsilon_t$ represents a total strain range under the creep-fatigue condition, and $k_p$ is a thickness coefficient of an oxidation film The creep threshold stress of P91 steel at 550° C. is 145 MPa, the cyclic hardening coefficient n' thereof is 0.13718, and the thickness coefficient of an oxidative film is 1.4. The creep rupture strain energy of the P91 steel can be represented by the following equation:

$w_f(\dot{w}, T) = \max[2.2392 \times \dot{w}^{0.1}, 75]$

Figure 2:
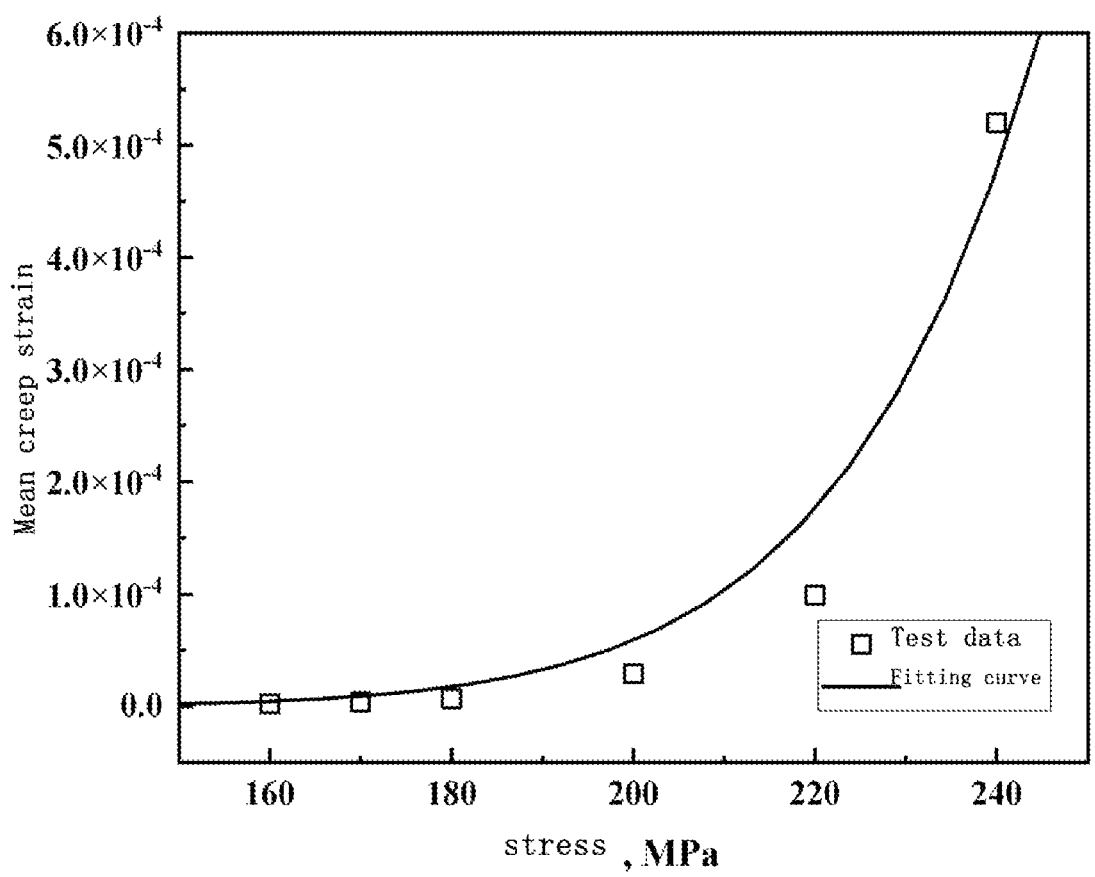
FIG. 2 is a material parameter fitting graph under a pure creep condition.

In Step (2), a relational graph between a mean creep rate and stress is acquired by utilizing the pure creep data, as shown in FIG. 2. Constants $\dot{\varepsilon}^*$, $\sigma^*$ and $n^*$ of a material under a pure creep condition are acquired by adopting a nonlinear fitting method. The constants $\dot{\varepsilon}^*$, $\sigma^*$ and $n^*$ of the P91 steel material at 550° C. are 6.04×10, 90 and 11.5, respectively. An expression of the mean creep rate is as follows:

$$\dot{\varepsilon}_a = \frac{\varepsilon_f}{t_r} = \dot{\varepsilon}^* \frac{\sigma}{\sigma^*} \left[ 1 + \left(\frac{\sigma}{\sigma^*}\right)^{n^*-1} \right]$$

where $\varepsilon_{71}$ represents creep rupture strain under stress $\sigma$, tr represents creep life under stress $\sigma$, $\dot{\varepsilon}^*$, and $n^*$ represent constants of the material under the pure creep condition.

In Step (3), the constants of the material under the pure creep condition are substituted into a stress relaxation model to acquire a stress relaxation expression in a holding stage.

$$\sigma(t) = \frac{\sigma_T \exp(-\dot{\varepsilon}^* Et/\sigma^*)}{\left\{ 1 + \left(\frac{\sigma_T}{\sigma^*}\right)^{n^*-1} [1 - \exp(t - \dot{\varepsilon}^* n^* Et/\sigma^*)] \right\}^{\frac{1}{n^*-1}}}$$

Figure 3:
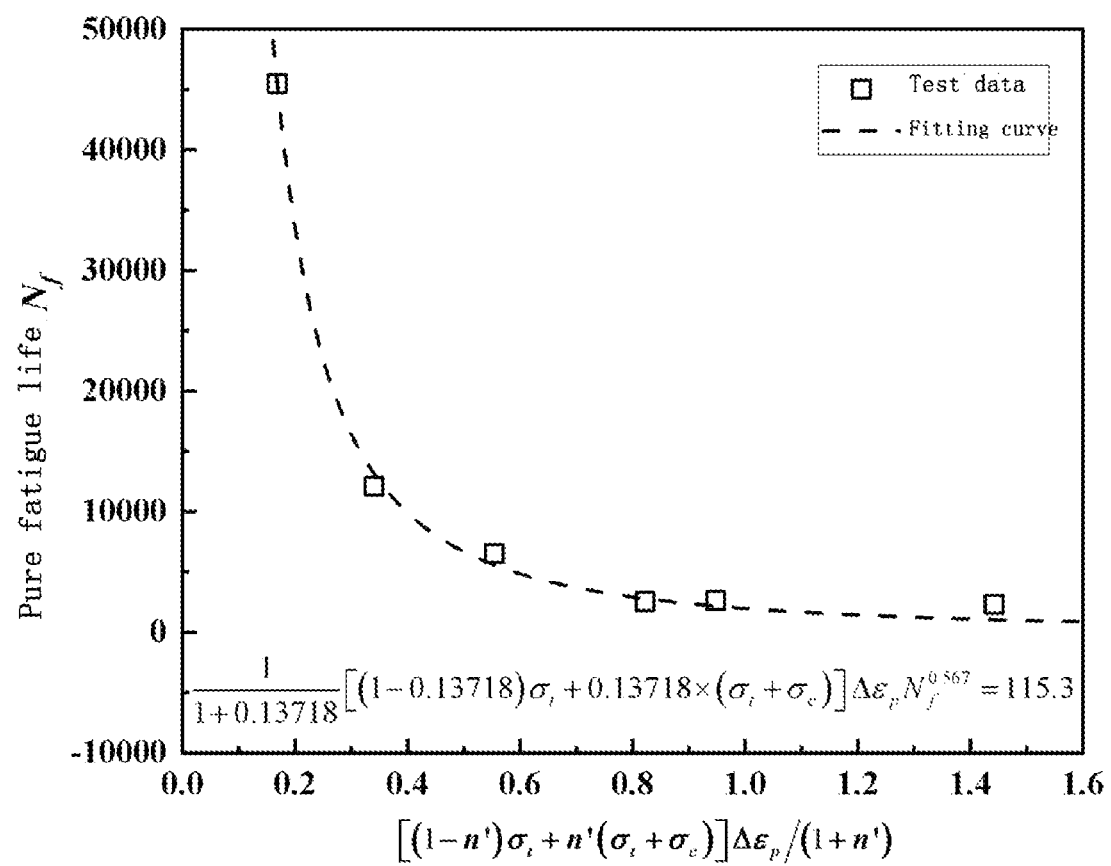
FIG. 3 is a material parameter fitting graph under a pure fatigue condition.

In Step (4), constants C and $\gamma$ of the material under the pure fatigue condition are acquired by means of test data under the pure fatigue condition and the following equation. A fitting curve is shown in FIG. 3. The constant C of the P91 steel material at 550° C. is 115.3, and $\gamma$ thereof is 0.567.

$$\frac{1-n'}{1+n'} \sigma_t [\Delta\varepsilon_t - (\sigma_t - \sigma_c)/E] N_f^\gamma = C$$

where $N_f$ represents the life under the pure fatigue condition, $\sigma$t represents the peak stretching stress under the pure fatigue condition, and $\sigma$c represents the peak compression stress under the pure fatigue condition.

In Step (5), a fatigue damage expression in creep-fatigue is established by means of the parameters of the material under the pure fatigue condition.

$$d_f = \left\{ \frac{C(1+n')}{(1-n')\sigma_T[\Delta\varepsilon_t - (\sigma_T - \sigma_C)/E] + n'(\sigma_T - \sigma_c)[\Delta\varepsilon_t - (\sigma_T - \sigma_C)/E]} \right\}^\gamma$$

where n' represents the cyclic hardening coefficient under the pure fatigue condition, $\sigma$T represents the peak stretching stress under the creep-fatigue condition, C and $\gamma$ represent the constants of the material under the pure fatigue condition, and $\Delta\varepsilon_t$ represents a total strain range under the creep-fatigue condition.

In Step (5), the initial stretching stress is defined as the peak stress at a half life of a pure fatigue test under the same total strain amplitude condition. By means of the following equation, a process of calculating the strain energy density in the upper part of creep-fatigue mean stress is as follows:

$$W_{upper} = \left(\frac{1-n'}{1+n'}\right)[\sigma_T - 0.5 \times (\sigma_T + \sigma_C)]\left[\Delta\varepsilon_t - \frac{(\sigma_T - \sigma_C)}{E}\right] + \frac{[\sigma_T - 0.5 \times (\sigma_T - \sigma_C)]^2 - [\sigma_H - 0.5 \times (\sigma_T - \sigma_C)]^2}{2E}$$

where $\sigma$H represents the stress when the holding time is over under the creep-fatigue condition.

In Step (6), by means of the following equation, in a process of calculating the strain energy density in the lower part of creep-fatigue mean stress, the expression is as follows:

$$W_{lower} = \left(\frac{1-n'}{1+n'}\right)[\sigma_T - 0.5 \times (\sigma_T + \sigma_C)]\left[\Delta\varepsilon_t + \frac{(\sigma_C - \sigma_H)}{E}\right]$$

Figure 4:
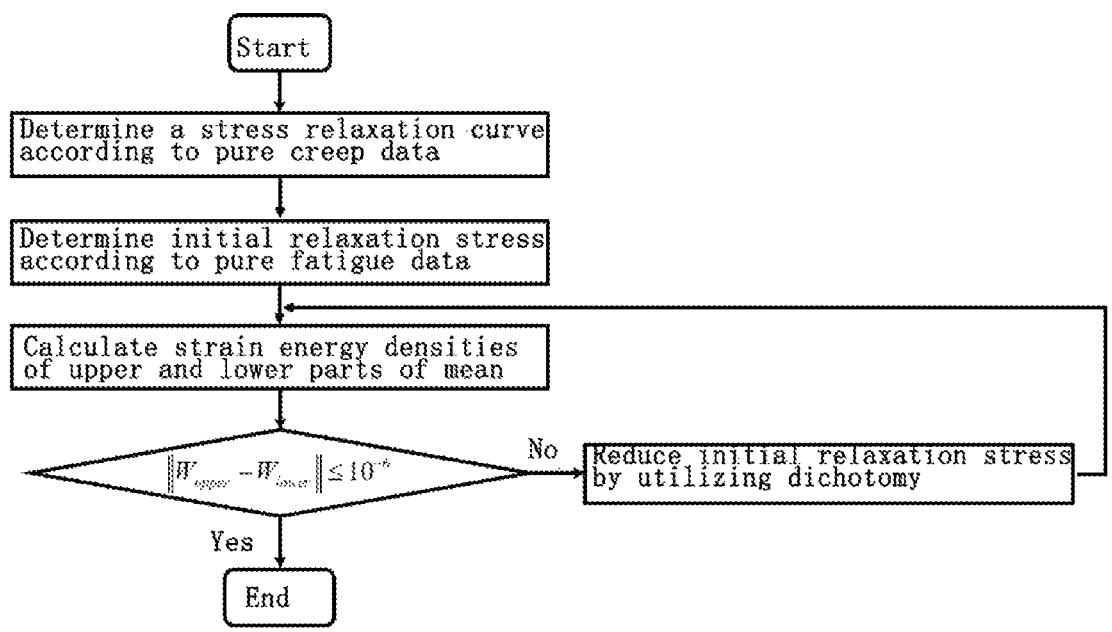
FIG. 4 is a flow chart of iterative calculation of the maximum loading stress.

In Step (7), the difference between strain energy densities in upper and lower parts of creep-fatigue mean stress is acquired, and Steps (3)-(6) are repeated to make the difference between strain energy densities less than the set threshold (10-6) through dichotomy to acquire the final creep damage, the final fatigue damage and the oxidative damage under such a circumstance. An iterative flow chart is as shown in FIG. 4.

Figure 5:
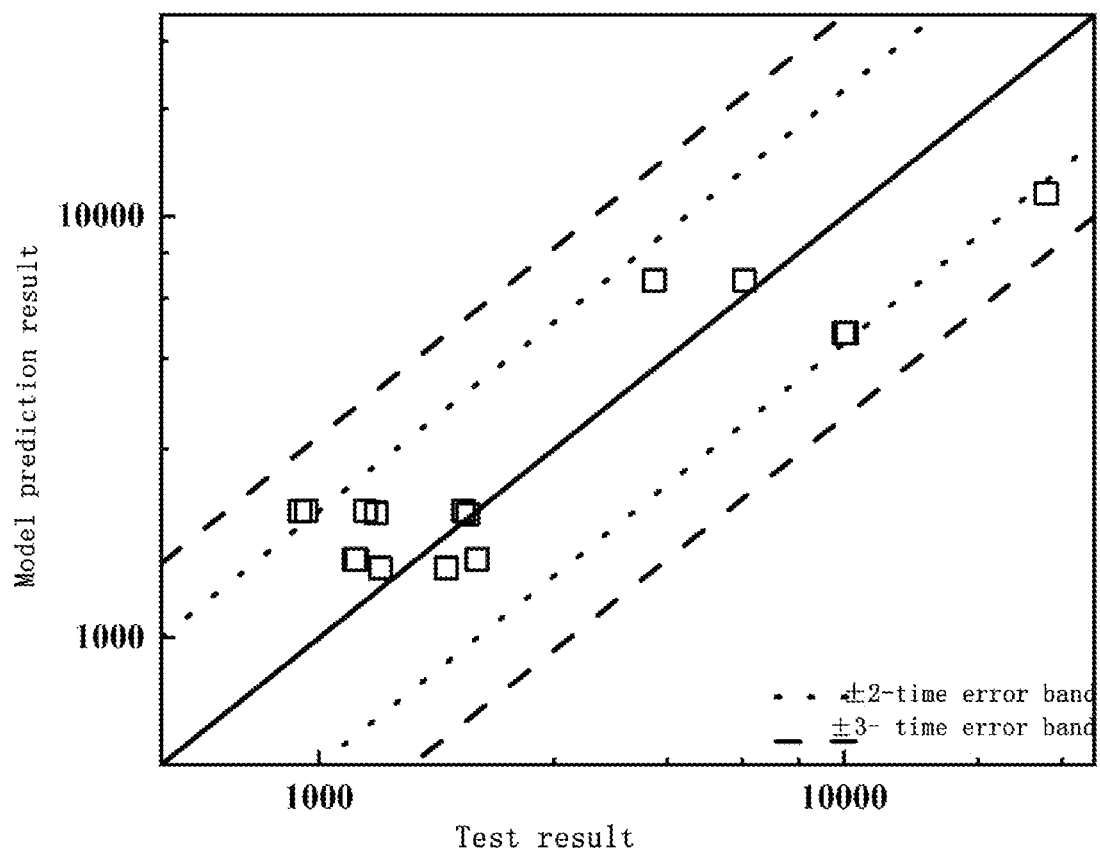
FIG. 5 is a graph of a prediction accuracy of a life prediction model in the present invention.
Figure 6:
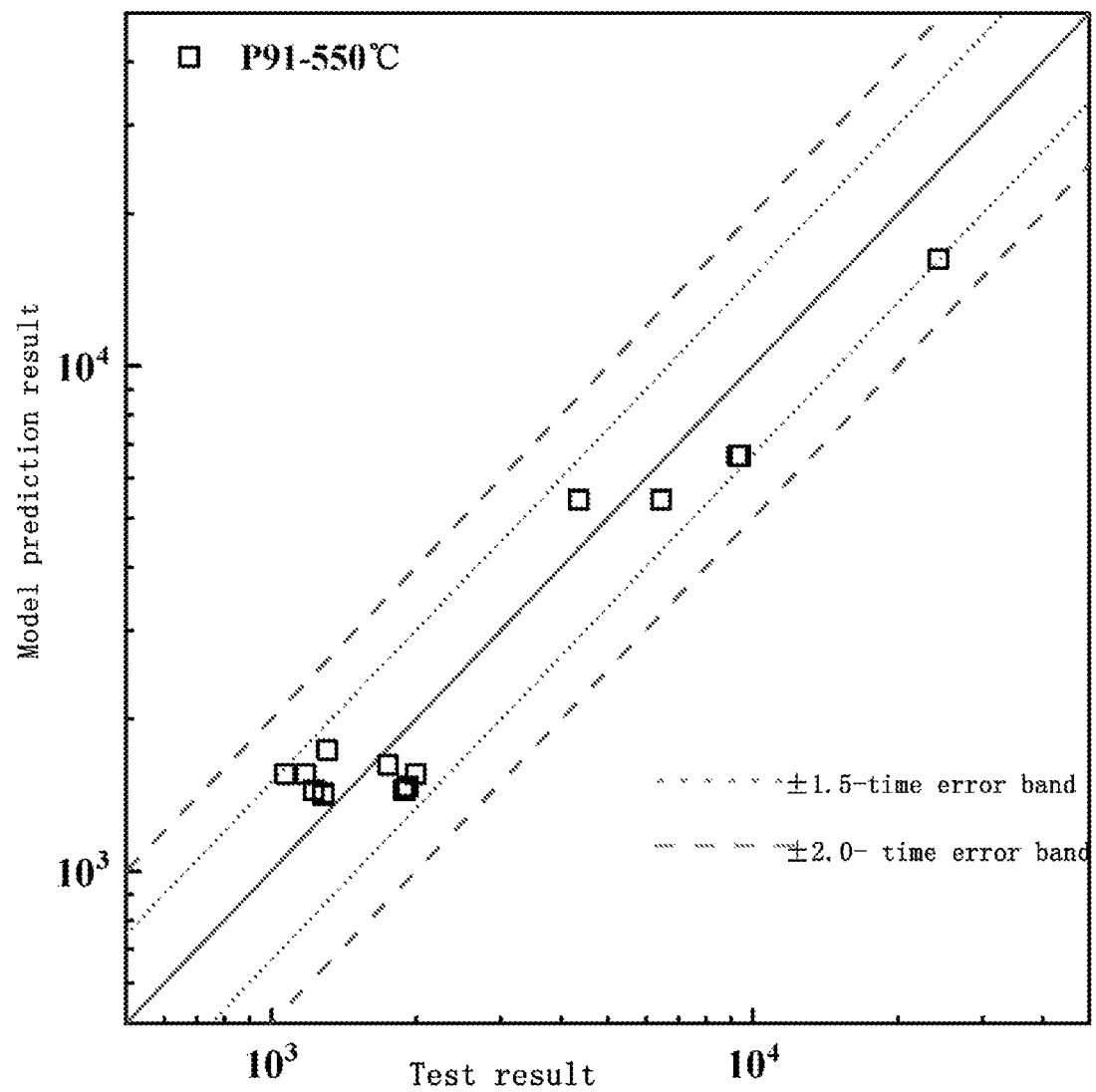
FIG. 6 is a graph of a life prediction accuracy by a conventional method based on test data.

In order to verify the effect of the method for predicting a creep-fatigue life based on pure creep data and pure fatigue data provided by the present invention, a prediction result of the creep-fatigue life of P91 at 550° C. predicted by the method is compared with a test result, as shown in FIG. 5. Most error diffusions between the predicted life and the test result are within a two-time error band. Therefore, the method for predicting a creep-fatigue life based on pure creep data and pure fatigue data provided by the present invention can better predict the high-temperature creep-fatigue life. The prediction result obtained by the method is compared with the prediction result based on the test data, as shown in FIG. 6. The prediction error between the two methods is small, verifying that the method provided by the present invention can making up limitation of the conventional method relying on test data to a certain extent.

In the description of the present specification, the description with reference to the terms "an embodiment", "some embodiments", "example", "specific example", or "some examples" and the like means that specific features, structures, materials, or features described in connection with the embodiments or examples are included in at least one embodiment or example of the present invention. In the description, schematic expressions of the terms do not have to mean same embodiments or exemplary embodiments. Furthermore, specific features, structures, materials or characteristics described can be combined in any one or more embodiments or exemplary embodiments in proper manners. In addition, under a condition without mutual contradiction, those skilled in the art can integrate or combine different embodiments or exemplary embodiments with different embodiments or exemplary embodiments described in the description.

Although the embodiments of the present invention have been shown and described above, it can be understood that the embodiments are exemplary and cannot be construed as limitation to the present invention. Those of ordinary skill in the art can make changes, modification, replacement and transformation on the embodiments within the scope of the present invention.

In addition, terms "first" and "second" are merely used for descriptive purposes and cannot be construed as indicating or implying relative importance or implicitly specifying the number of indicated technical features. Thus, features defining "first", "second" and the like can expressively or implicitly include at least one feature. In the description of the present invention, unless otherwise specified, "a plurality of" means at least two, for example, two, three and the like.

What is claimed is:

1. A method for predicting a creep-fatigue life of a structural part of a thermal power unit serving in a complex working condition, comprising the following steps:

constructing a creep-fatigue life prediction model for predicting a high-temperature creep-fatigue life of the structural part of the thermal power unit according to a creep damage and a fatigue damage of the structural part of the thermal power unit and an oxidative damage based on cycle number, wherein an expression of the creep-fatigue life prediction model ($N_{CF}$) is as follows:

$$N_{CF} = \frac{1}{\frac{d_c}{1-d_f-d_o} + \frac{d_f}{1-d_c-d_o} + d_o}$$

where $d_c$ represents the creep damage, $d_f$ represents the fatigue damage, and $d_o$ represents the oxidative damage;

in the process of constructing the creep-fatigue life prediction model, acquiring an initial creep damage according to a stress relaxation curve of the structural part of the thermal power unit;

generating an initial fatigue damage according to a cyclic hardening coefficient, an elasticity modulus and other related material constants of the structural part of the thermal power unit; and acquiring a difference between strain energy densities in upper and lower parts of creep-fatigue mean stress based on the initial creep damage and the initial fatigue damage, and making the difference between strain energy densities less than a set threshold through dichotomy iteration to acquire the creep damage, the fatigue damage and the oxidative damage under such a circumstance, so as to construct the creep-fatigue life prediction model to guarantee a normal and safe operation of the thermal power unit.

2. The method for predicting a creep-fatigue life of a structural part of a thermal power unit according to claim 1, wherein in the process of constructing the creep-fatigue life prediction model, an expression of the creep damage is as follows:

$$d_c = \int_0^{th} \frac{\sigma \cdot (\sigma - \sigma_{th})}{E \cdot w_f(\dot{w}, T)} - \frac{\sigma \cdot (\sigma - \sigma_{th})}{E \cdot w_{f,max}(\dot{w}, T)} dt;$$

an expression of the fatigue damage is as follows:

$$d_f = \left\{ \frac{C(1+n')}{(1-n')\sigma_T[\Delta\varepsilon_t - (\sigma_T - \sigma_C)/E] + n'(\sigma_T - \sigma_c)[\Delta\varepsilon_t - (\sigma_T - \sigma_C)/E]} \right\}^\gamma$$

an expression of the oxidative damage is as follows:

$$d_o = 0.5^{20} \int 0.5 \sqrt{k_p} t^{-0.5} dt;$$

where σ represents a stress intensity at time t, $\dot{\sigma}$ represents a stress change rate at time t, E represents the elasticity modulus of a material under a cyclic load, $w_f$ represents a creep rupture strain energy, σth represents a holding time in the creep-fatigue test, σth represents creep threshold stress under a pure creep condition, n' represents the cyclic hardening coefficient under a pure fatigue condition, $\sigma_T$ represents peak stretching stress under a creep-fatigue condition, $\sigma_C$ represents peak compression stress under the creep-fatigue condition, C and γ represent constants of the material under the pure fatigue condition, $\Delta\varepsilon_t$ represents a total strain range under the creep-fatigue condition, and $k_p$ is a thickness coefficient of an oxidation film.

3. The method for predicting a creep-fatigue life of a structural part of a thermal power unit according to claim 2, wherein
in the processes of acquiring the strain energy density in the upper part, an expression of the strain energy density in the upper part is as follows:

$$W_{upper} = \left(\frac{1-n'}{1+n'}\right)[\sigma_T - 0.5 \times (\sigma_T + \sigma_C)]\left[\Delta\varepsilon_t - \frac{(\sigma_T - \sigma_C)}{E}\right] +$$
$$\frac{[\sigma_T - 0.5 \times (\sigma_T - \sigma_C)]^2 - [\sigma_H - 0.5 \times (\sigma_T - \sigma_C)]^2}{2E}$$

where $\sigma_H$ represents the stress when the holding time is over under the creep-fatigue condition.

4. The method for predicting a creep-fatigue life of a structural part of a thermal power unit according to claim 3, wherein
in the processes of acquiring the strain energy density in the lower part, an expression of the strain energy density in the lower part is as follows:

$$W_{lower} = \left(\frac{1-n'}{1+n'}\right)[\sigma_T - 0.5 \times (\sigma_T + \sigma_C)]\left[\Delta\varepsilon_t + \frac{(\sigma_C - \sigma_H)}{E}\right]$$

5. The method for predicting a creep-fatigue life of a structural part of a thermal power unit according to claim 4, wherein
in the process of acquiring the initial creep damage, based on the pure creep data, the stress relaxation curve is generated according to the relation between a mean creep rate and the stress, where
an expression of the mean creep rate is as follows:

$$\dot{\varepsilon}_a = \frac{\varepsilon_f}{t_r} = \dot{\varepsilon}^* \frac{\sigma}{\sigma^*}\left[1 + \left(\frac{\sigma}{\sigma^*}\right)^{n^*-1}\right]$$

where $\varepsilon_{71}$ represents the creep rupture strain under the stress $\sigma$, $t_r$ represents the creep life under the stress $\sigma$, $\dot{\varepsilon}^*$, $\sigma^*$ and $n^*$ represent the constants of the material under the pure creep condition.

6. The method for predicting a creep-fatigue life of a structural part of a thermal power unit according to claim 5, wherein
in the process of generating the stress relaxation curve, an expression of the stress relaxation curve is as follows:

$$\sigma(t) = \frac{\sigma_T \exp(-\dot{\varepsilon}^* Et/\sigma^*)}{\left\{1 + \left(\frac{\sigma_T}{\sigma^*}\right)^{n^*-1}\left[1 - \exp(t - \dot{\varepsilon}^* n^* Et/\sigma^*)\right]\right\}^{\frac{1}{n^*-1}}}.$$

\* \* \* \* \*